US 8,095,065 B2

(12) United States Patent
Nagara et al.

(10) Patent No.: US 8,095,065 B2
(45) Date of Patent: Jan. 10, 2012

(54) REMOTE CUSTOMIZABLE VEHICLE ENTERTAINMENT SYSTEM WITH MULTI-SOURCE PRESETS

(75) Inventors: Wes Albert Nagara, Commerce Township, MI (US); Theodore Charles Wingrove, Canton, MI (US); Anthony Ciatti, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 495 days.

(21) Appl. No.: 12/342,259

(22) Filed: Dec. 23, 2008

(65) Prior Publication Data

US 2009/0176469 A1    Jul. 9, 2009

Related U.S. Application Data

(63) Continuation-in-part of application No. 12/062,776, filed on Apr. 4, 2008.

(60) Provisional application No. 61/019,082, filed on Jan. 4, 2008.

(51) Int. Cl.
*H04H 40/00* (2008.01)

(52) U.S. Cl. ................... 455/3.06; 455/186.1

(58) Field of Classification Search ............... 455/3.06, 455/186.1
See application file for complete search history.

(56) References Cited

U.S. PATENT DOCUMENTS

| 5,794,164 | A | 8/1998 | Beckert et al. |
| 6,553,308 | B1 | 4/2003 | Uhlmann et al. |
| 6,559,773 | B1 | 5/2003 | Berry |
| 7,720,988 | B2 * | 5/2010 | Kusano et al. ............ 709/232 |
| 2002/0046084 | A1 * | 4/2002 | Steele et al. ............ 705/14 |
| 2003/0027594 | A1 | 2/2003 | Pfoertner |
| 2005/0021190 | A1 | 1/2005 | Worrell et al. |
| 2005/0090279 | A9 | 4/2005 | Witkowski et al. |
| 2005/0261815 | A1 | 11/2005 | Cowelchuk et al. |
| 2006/0004788 | A1 | 1/2006 | Pilgrim et al. |

FOREIGN PATENT DOCUMENTS

| EP | 1528362 A1 | 4/2005 |
| JP | 2008017013 A | 1/2008 |
| WO | 2007066662 A1 | 6/2007 |

* cited by examiner

*Primary Examiner* — Khai M Nguyen
(74) *Attorney, Agent, or Firm* — Dickinson Wright PLLC (57) ABSTRACT

A vehicle entertainment system capable of being remotely customized from a remote secondary device. The system includes a controller disposed within the system that is capable of receiving user input through an internet connection. A display is in communication with the controller and capable of implementing the received user input to customize the system.

26 Claims, 7 Drawing Sheets

REMOTE CUSTOMIZABLE VEHICLE ENTERTAINMENT SYSTEM WITH MULTI-SOURCE PRESETS

CROSS REFERENCE TO RELATED APPLICATION

This application is a continuation-in-part under 35 U.S.C. 120 of U.S. Utility patent application Ser. No. 12/062,776, filed Apr. 4, 2008, which claims the benefit of U.S. Provisional Application No. 61/019,082, filed Jan. 4, 2008, the entire disclosure of the utility application and provisional application being considered part of the disclosure of this application and hereby incorporated by reference.

BACKGROUND OF THE INVENTION

1. Technical Field

This present invention is directed to a system and method for providing single-action multi-source presets for vehicle entertainment systems and more particularly for providing remote customization of vehicle entertainment systems.

2. Discussion

Manufacturers have long produced cars having radios with preset or favorite buttons that allow a user to quickly and easily select a desired radio station for the current radio band. As vehicle radios have become more complex and added additional options to become vehicle entertainment systems, these preset or favorite buttons have not changed.

Originally, preset buttons manually moved an analog tuner of the radio to an estimated position, regardless of whether the radio was tuned to the FM or AM band. Therefore, a preset set by a user for a particular FM radio station would not work as a preset when the radio was tuned to the AM band for a particular AM radio station as it would move the tuner to the desired FM position. After pressing the presets, the user also had to adjust the tuner to fine tune the radio to optimally receive the desired broadcast. Due to the mechanical nature of the preset buttons, pressing the preset to move the tuner from one end to of the band to the other end required significant force. Over time, these mechanical preset buttons would break due to their mechanical nature.

As radios started using digital tuners, many of the problems associated with mechanical preset buttons were eliminated. Digital preset buttons are easy to push and their digital nature allows for precise tuning. Digital preset buttons also allowed a preset button to include at least one favorite radio station for each radio band, thereby allowing for many more presets than analog presets without requiring additional space. More specifically, digital presets change their set selections depending on the selected radio band, such as the user being able to assign an AM frequency selection and an FM frequency selection to the same preset button. As the FM radio band gained popularity, to allow different users of a vehicle to each have their own FM presets or provide additional preset options to a user, many vehicles would provide an FM1 and FM2 selection which only changed the selected frequency associated with each preset. However, the preset buttons were limited to selecting a set preset from the current audio source, such as AM, FM1, or FM2 and were only available when the associated audio source was selected and active.

Figure 5:
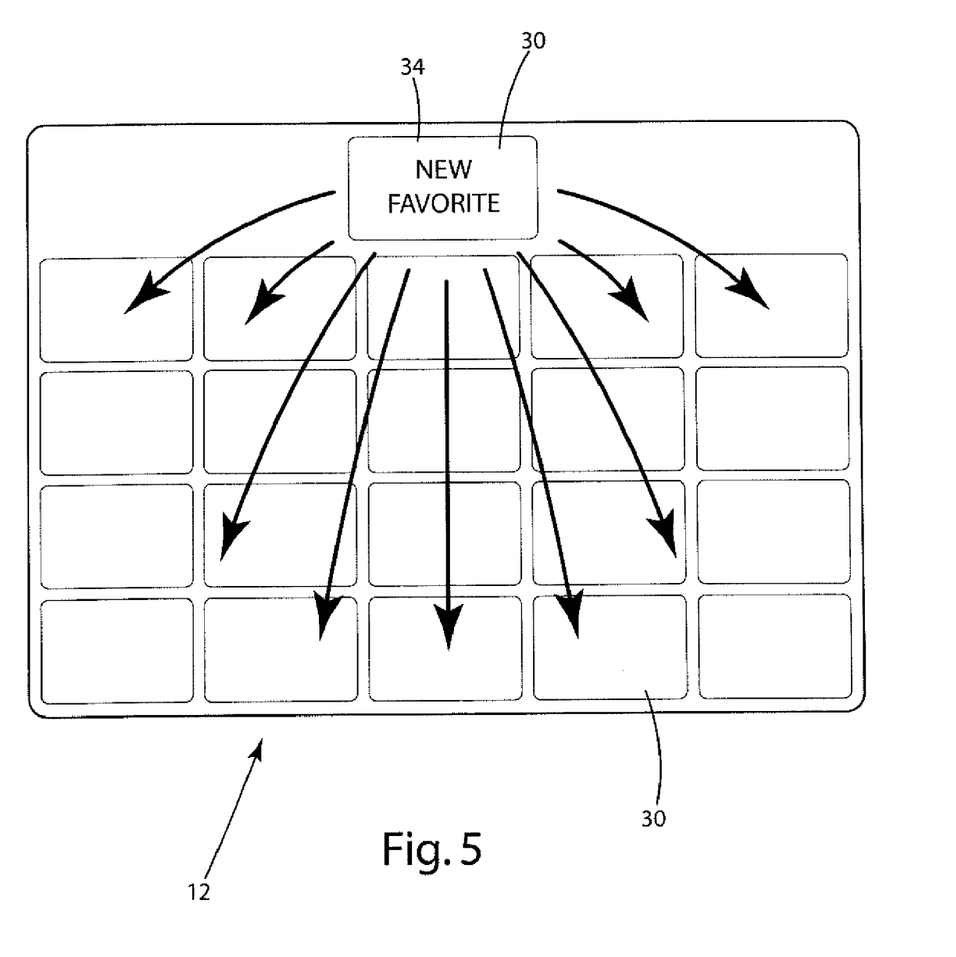
FIG. 5 is a schematic diagram illustrating the ease of adding a new favorite over existing favorites into a multi-source favorite selection scheme.
Figure 6:
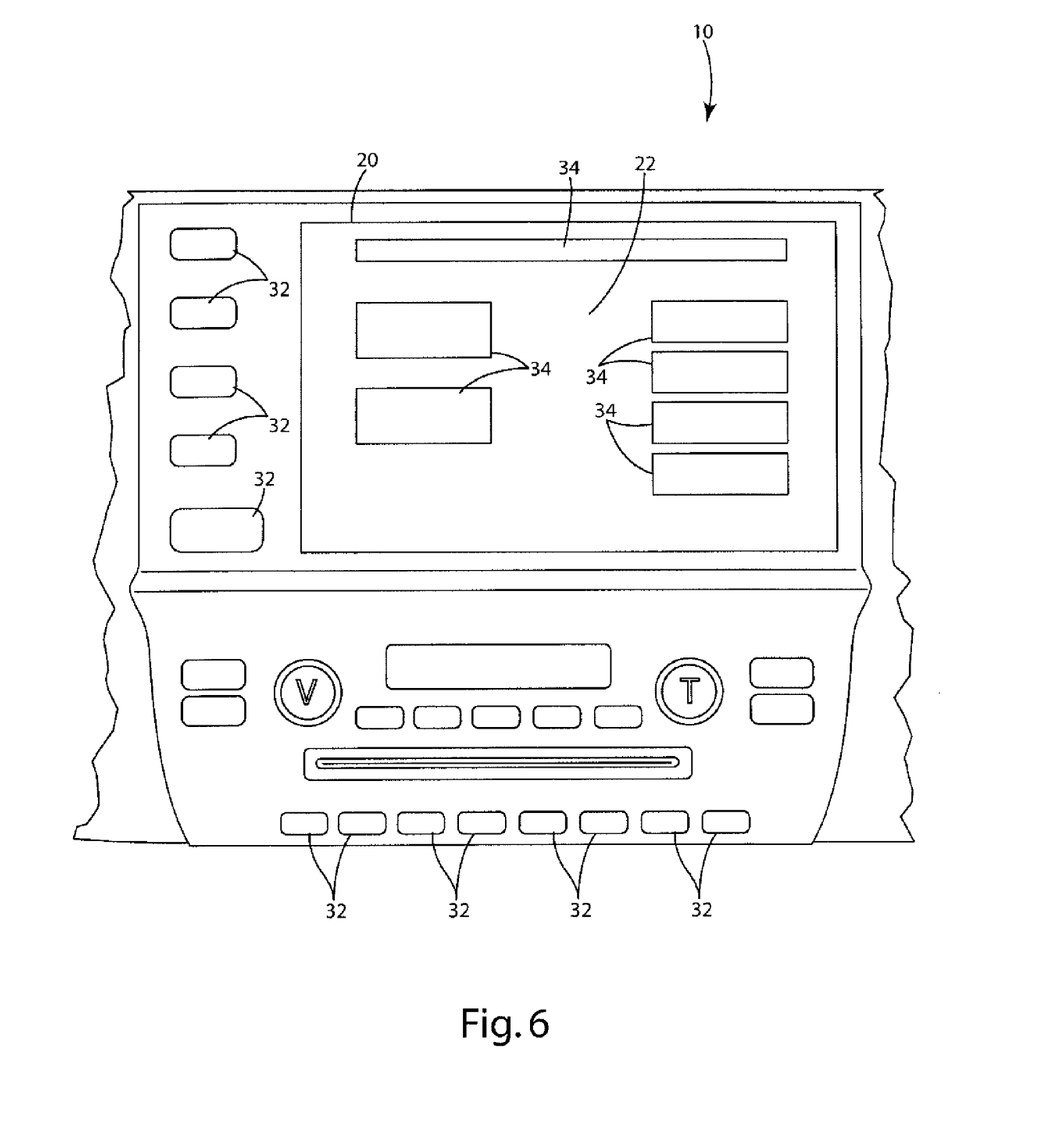
FIG. 6 is a schematic view of a vehicle entertainment system with an exemplary display screen showing exemplary soft key favorites across multi-source inputs on a single display screen.

As vehicle radios move to multi-platform vehicle entertainment systems, the preset functions have remained essentially the same even though radios now use a variety of signals in addition to the common AM and FM bands to create a complete entertainment system. More particularly, vehicle radios or vehicle entertainment systems may include or receive multiple sources, such as AM, FM, Satellite Radio, tape, CD, CD changers, MP3 devices, USB devices, music players, IPods, memory devices, navigation systems and other sources. Even though the entertainment systems include more sources, the preset buttons, as illustrated in FIG. 5, still only allow selection of radio stations, more particularly only allow selections of AM, FM, and in some instances satellite favorite radio stations.

Although some radios have presets that allow selection of a particular CD in a CD changer, a particular CD cannot be selected until the CD changer is selected as the source input. Preset buttons also still do not allow for direct inputs for complex favorite selections on sources other than the current source. For example, while in the FM radio source, the user cannot select individual playlists or files on an MP3 or USB device using a preset button. Also, if a user is listening to an audio book on a MP3 player, and then desires to listen to the radio, such as an FM radio station, the user cannot select the particular desired radio station with a single push of a preset button or a single-action that changes the input for the vehicle entertainment system from the audio book to the FM band and the desired FM radio station directly in a single button push.

Vehicle entertainment systems have generally allowed for limited customization of the system the while seated in the vehicle. For example, it is known to set a preset by tuning a radio to the desired AM or FM frequency and while on that frequency holding the desired preset button for a set period of time in order to associate the desired frequency with the preset button.

SUMMARY OF THE INVENTION

In view of the above, the present invention is directed to multi-source or multi-command single-action preset and favorite selections for users of vehicle entertainment or infotainment systems.

Modern vehicles generally include a vehicle entertainment system having a display. The vehicle entertainment system typically receives multi-source inputs such as FM, AM, and satellite radio signals. Also, the vehicle entertainment system may receive CD, DVD, and tape inputs. Some vehicle entertainment systems may further receive signals or act as interfaces for TV signals, USB devices, memory devices, storage devices, music players, navigation systems, phones and even internet connections.

The present invention includes single-action preset buttons that through a single-action allow selection of an entertainment source and a particular selection within that source, even when the current source is different from the selected source. The source may be any desired input or content source and the particular selection within that source. The preset buttons may be hard keyed or soft keyed. Soft key buttons include both physical buttons having corresponding indicators on an adjacent display or touch screen buttons solely located on the display.

The present invention is particularly useful with systems having a touch interface display. The present invention allows for a user to easily configure and provide soft key favorites in combination with a touch screen display.

The present invention provides for remote customization of vehicle entertainment systems. The vehicle entertainment system is capable of being remotely customized from a remote secondary device, such as a computer or cell phone. The system can customize features of the vehicle entertainment system display, including but not limited to the display theme, font, color, shape, size, layout, applications, graphics, and presets. The system includes a controller disposed within the vehicle system that is capable of receiving user input through an internet connection. The display is in communication with the controller and capable of implementing the received user input. The system is customized by receiving the user input from the secondary device through the internet connection. A web portal design or other desktop-based software application may be set up to enable the user to customize the display or human machine interface (HMI). The present invention makes use of internet connectivity to allow the user to customize their vehicle entertainment system from the convenience of their home, office, or anywhere else they might have access to an internet connection. Additionally, the system could utilize Bluetooth connectivity, a Wi-Fi connection, or, in the future, any other wireless connections to transfer the user input from the secondary device to the vehicle entertainment system.

The present invention provides a simple and efficient alternative to the current methods of customizing vehicle entertainment systems, which is done while seated in the vehicle. The present invention allows for a user to customize a vehicle entertainment system from a location other than the vehicle thus allowing greater convenience. The changes may be real time or activate upon startup of the vehicle. The system also allows for a wider variety of changes, including graphical changes to the interface, commonly known in the industry as "skins". This allows easy graphical customization without the need for expensive or complex graphic editing capabilities directly in the vehicle entertainment system. Another possibility is the ability to add or customize applications on the vehicle's entertainment system.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

The present invention is directed to a vehicle entertainment system 10 or infotainment system having single-action presets 30 that provide one touch access to favorite sources across different media sources. As illustrated in the figures, the system 10 generally includes a plurality of single-action presets 30. The single-action presets 30 allow easy selection of or communication with a specific input source from a plurality of input sources received by, in communication with, or capable of being output by the system and a specific selection or action within the specific input source.

Figure 4:
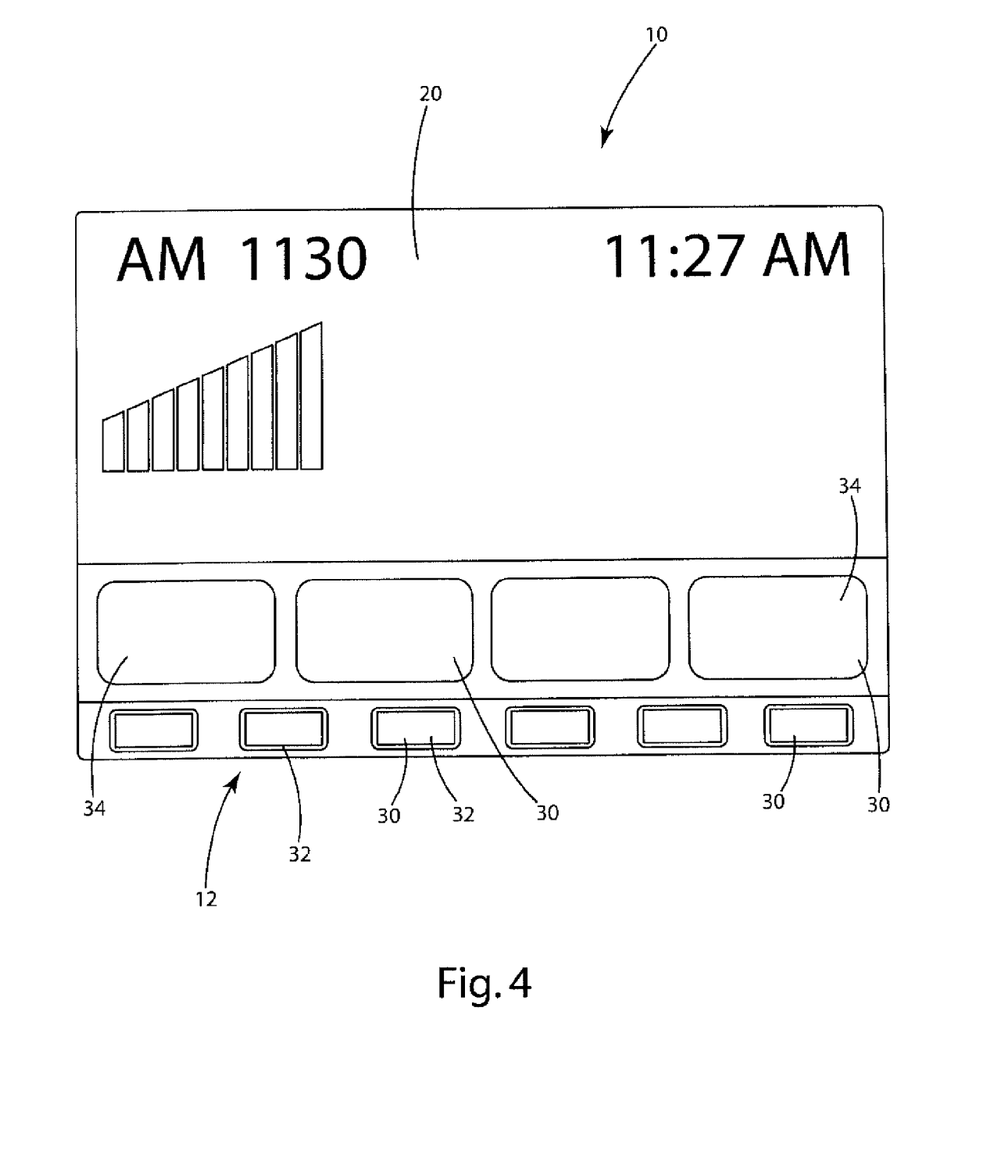
FIG. 4 is a schematic diagram of an exemplary vehicle entertainment system with an exemplary AM radio skin showing desirable information and soft key and hard key preset keys which may be directed to single source AM favorites or multi-source favorites.

The system 10 may be any entertainment system, but as illustrated in the figures, the present invention is particularly applicable to vehicle entertainment systems. The entertainment system 10 may be any system known in the art including, but not limited to, drive information and climate systems. While the interface 12 of the system may take on any desired configuration, the figures primarily illustrate the vehicle entertainment system 10 as having a touch screen display 20 with soft key preset buttons 34. Of course, any style preset buttons may be used, including the hard key presets 32 as illustrated in FIG. 4. The user interface 12 may also be configured in any desired manner and use a variety of different styles of single-action preset buttons 30. For example, the presets 30 may be accessed through the illustrated soft touch presets 34, hard key presets 32, or a scroll dial input (not illustrated). As illustrated in the figures, the vehicle entertainment system 10, and specifically the user interface 12, may include a display 20 that is touch screen sensitive to allow inputting of data or selection of inputs, and in particular, selection of user favorites through presets 30 displayed on the screen by touching a particular point on the display 20. As illustrated in FIG. 4, if the system includes hard keys 32, the functionality of the hard keys 32 may at times be displayed on the display 20.

The system 10 is configured to receive, produce, or be in communication with a variety of input sources, which then are converted to an output to the user. For purposes of this application, whether the system 10 (1) receives the input signal wirelessly from external the vehicle or internal to the vehicle such as radio signals, wi-fi signals, or Bluetooth signals, (2) produces the signal such through as a built-in CD player or tape player, or (3) is in communication with the device, such as a plug-in device, or any other fixed or removable media or by any other means, shall all be referred to as the device being in communication with the selected input source. More specifically, any source of input, no matter how connected to the system, or even as part of the system shall be referred to as an input source in communication with the system.

The present invention may be added easily to known systems. The system 10, in addition to a user interface 12 having single-action presets 30, includes a controller to select the input source. For some input sources, the system may only passively interact by receiving signals and then selecting a particular selection within the input signals, such as an FM radio frequency or broadcast within the input source of the FM radio band. For other input sources, the system may include reciprocal communication with the input source, such as directing a mobile phone to dial a specified number, directing a navigation system to provide directions to a desired destination, or even access to a particular folder on a mass storage device. Examples of the input source include, but are not limited to, radio signals such as AM, FM, satellite and weather band signals, TV signals, video signals such as DVD, Satellite, Internet, mass storage devices, attached video players, and other sources, communication devices such as mobile phones, computer, and other devices, navigation systems, and other audio sources such as CDs, music players, mass storage devices, tape players, MP3 players, microblogs, or other devices.

The single-action presets 30 of the present invention allow a user with a single-action to change both the input source and select a specific selection related to the input source. If the preset is programmed to a radio band, such as the FM band and to a particular frequency within that radio band, a user may with a single-action change the system to output audio from the chosen FM radio station, no matter what the original input source was. Therefore, a user with a single-action may change the system from playing a CD to a desired radio station, even through that radio station was not previously playing when the CD was chosen as the input source. The system 10 may use any type of operating platform and software, so long as it is able to support the single action presets 30. As another example, the user by a single-action may press the preset 30, thereby instructing the system to mute the radio, change the input audio source to the mobile phone in communication with the system and for the specific selection instruct the mobile phone to dial a particular number. Similarly, if the system is in communication with a navigation system, the system in response to pressing a programmed preset 30 would select the navigation system as the input source and the specified selection may be an instruction for the navigation system to provide directions to a particular address. In some instances, the system 10 may change only one of the display or audio input source and keep the other of the display or audio constant. For example, with the above described navigation system, the system 10 may keep the audio input source, such as the radio being output to the user, however the display may be changed to a map showing directions to the selected address. The above selections are only examples of a wide variety of possibilities.

Figure 2:
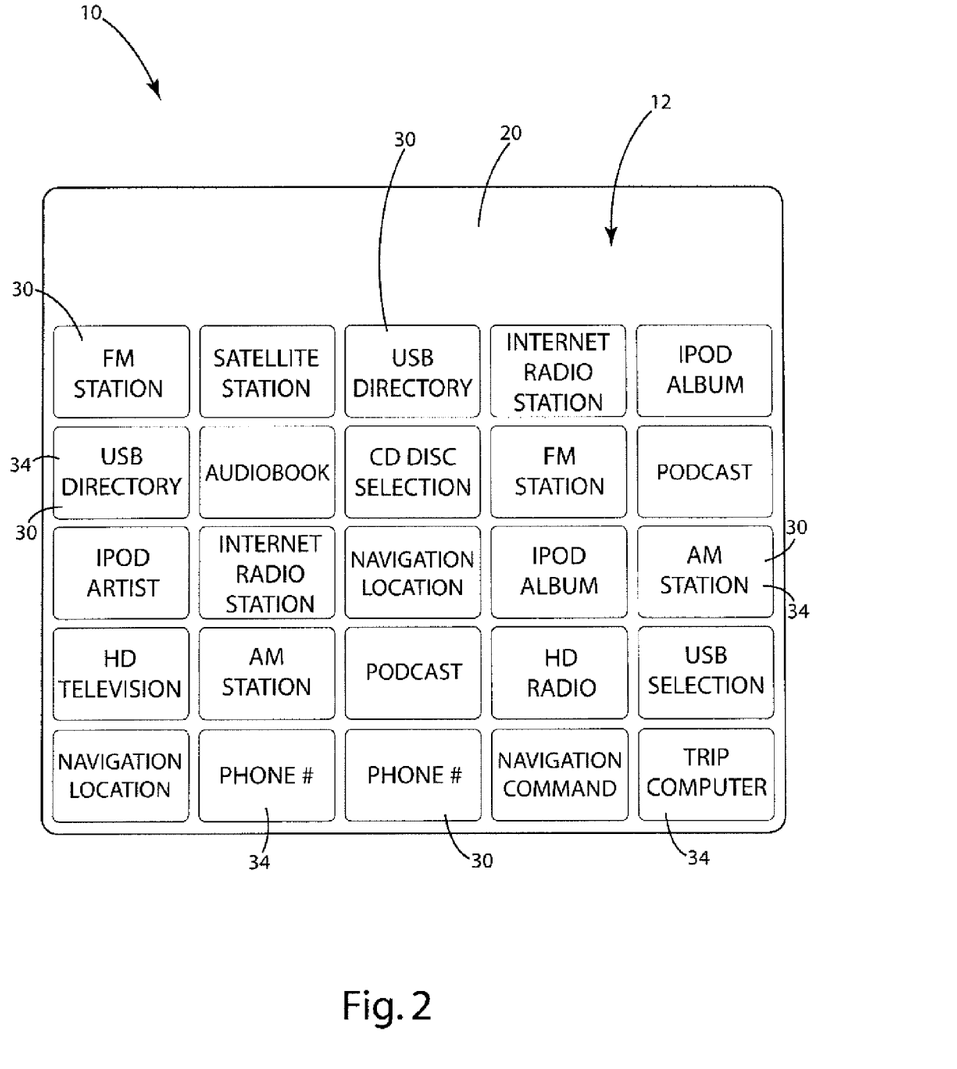
FIG. 2 is a schematic view of a vehicle entertainment system with an exemplary display screen showing exemplary soft key favorites across multi-source inputs on a single display screen.

As users are accustomed to many presets for each source, it may be desirable to provide presets 30 through the display, such as the illustrated soft-touch presets 34. Providing presets 30 through a display 20 such as a touch screen allows the manufacturer or user to select unique skins or looks for the displayed presets 30. For example, the system 10 may display only the active programmed presets such as six presets. As more presets are programmed, the system adds them and displays them. Only displaying the already programmed presets keeps the display 20 from becoming cluttered and allows room for displayed content to the user, in addition to the presets. Therefore, by using single-action multi-source presets 30, such as the illustrated soft presets 34 on a display 20, illustrated as a touch screen, a user can assign particular presets 30 or areas of the display 20 to multi-media favorites across different media sources. The presets 30 may be selectable no matter what input or media source is currently being used. However, in some embodiments, the displayed presets 30 may change or may be reorganized depending on user preferences. As illustrated in FIG. 2, a variety of media sources and desired favorites within those sources may be selected from a single screen on the display 20.

As illustrated in the figures, the use of soft touch presets 32 through an input device such as the display 20 or the like provides an easy to read and configure interface for a user. Although, as illustrated in FIG. 4, hard touch presets 34 may be used, the soft touch presets 32 do allow for an easier graphic display and interface with the users. Displaying the soft touch interfaces 34 as illustrated in the figures also allows easy and visual modification and selection of the presets 20. Of course, hard key presets 34 and soft key presets 32 may be used in combination with each other. In some embodiments, one of the hard key presets 34 and soft key presets 32 may relate to the selected source and not single-action presets.

In addition to the preset buttons 30 allowing selection of favorite stations across the radio bands, the user may configure the presets 30 to also refer to different sources. For example, the presets 30 labeled as FM station can refer to a specific bandwidth frequency within the FM band while the presets 30 labeled in FIG. 1 as CD disc selection may refer to a specified disc, while the presets 30 labeled as USB selection may refer to a media input such as a connected iPod, flash disc, or MP3 player. As further illustrated in the figures, the presets 30 may be set to any desired device, such as a particular phone number, a location in the navigation system, an artist, play list, album, or audio book on a music player, a folder on a USB device, a link on the world wide web, or any other possible selection available to the user. For example, a person may have a preset 30 in all screens which when selected mutes the current audio source and dials a commonly used phone number such as the user's home or office. The system 10, while the user is listening to the radio, may allow on push a preset 30 to instruct the navigation system to provide directions to the address associated with that preset 30 while continuing to allow the user to listen to the radio.

The system 10 may also be used to update a user's microblog. The system 10 may be linked to microblogging web sites such as Twitter, Jaiku, Myspace, Facebook, or any other microblogging web site known in the art. In the present invention, a user may assign a preset 30 to a microblogging web site. The preset 30 may be a soft touch preset 34 or a hard touch preset 32. After pressing the preset 30, the user can verbally make a post to the associated web site. The system 10 would include software known in the art that converts the verbal post into text to be posted on the microblogging web site. The post are typically 140-200 words in length and allow a microblogger to update their microblogging website to inform the readers of the site of the user's current thoughts or happenings. The microblogging feature allows a user to update their microblog without the danger of texting while driving the vehicle.

Figure 3:
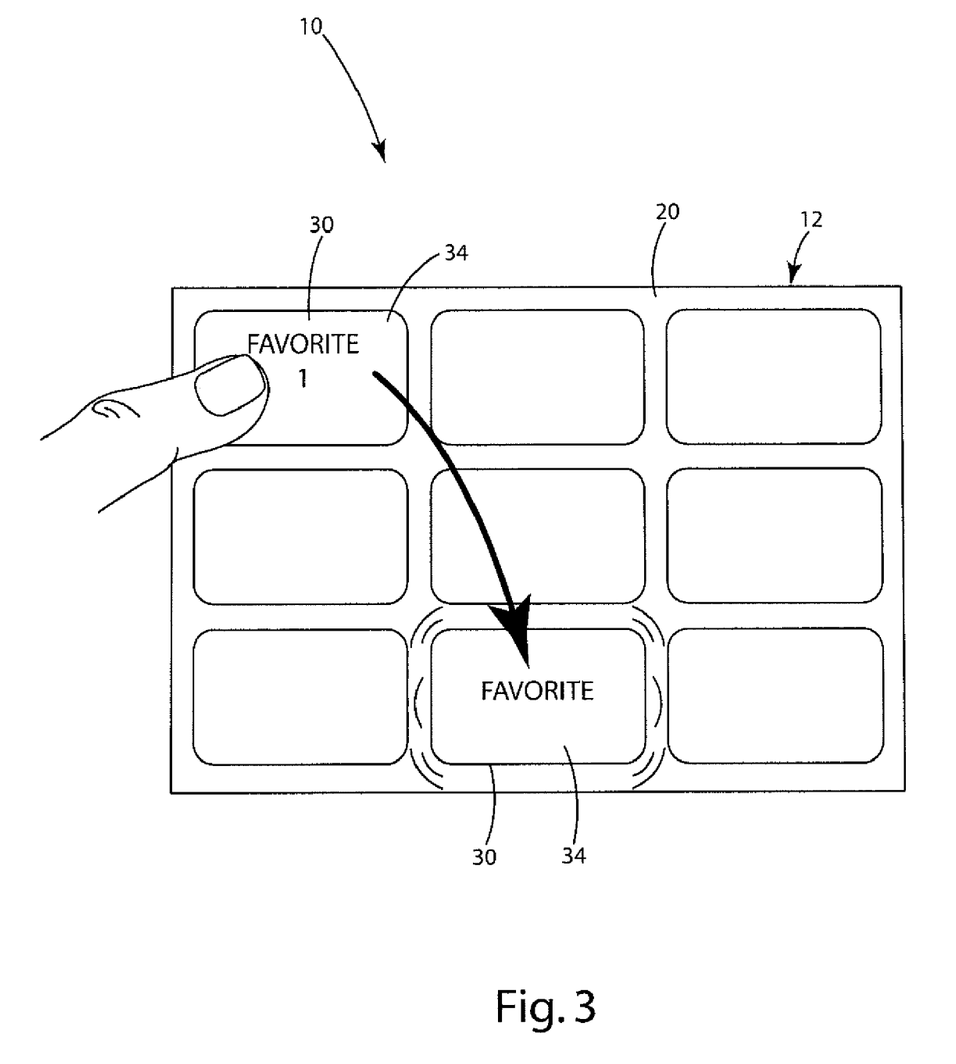
FIG. 3 is a schematic diagram illustrating the easy movement and programming of soft key buttons.

As illustrated in FIG. 3, the graphical interface allows easy moving or rearrangement of preset or favorite buttons as well as media selection of presets. The user selects a preset, such as by holding the preset for a short time, and then drags and drops the preset to a different location that suits the user. Therefore, the user can arrange preset buttons 30 along with media selection buttons to the preference of the user that allow the user to select their desired audio content from the vehicle entertainment system with as little distraction as possible and as quickly as possible.

Figure 7:
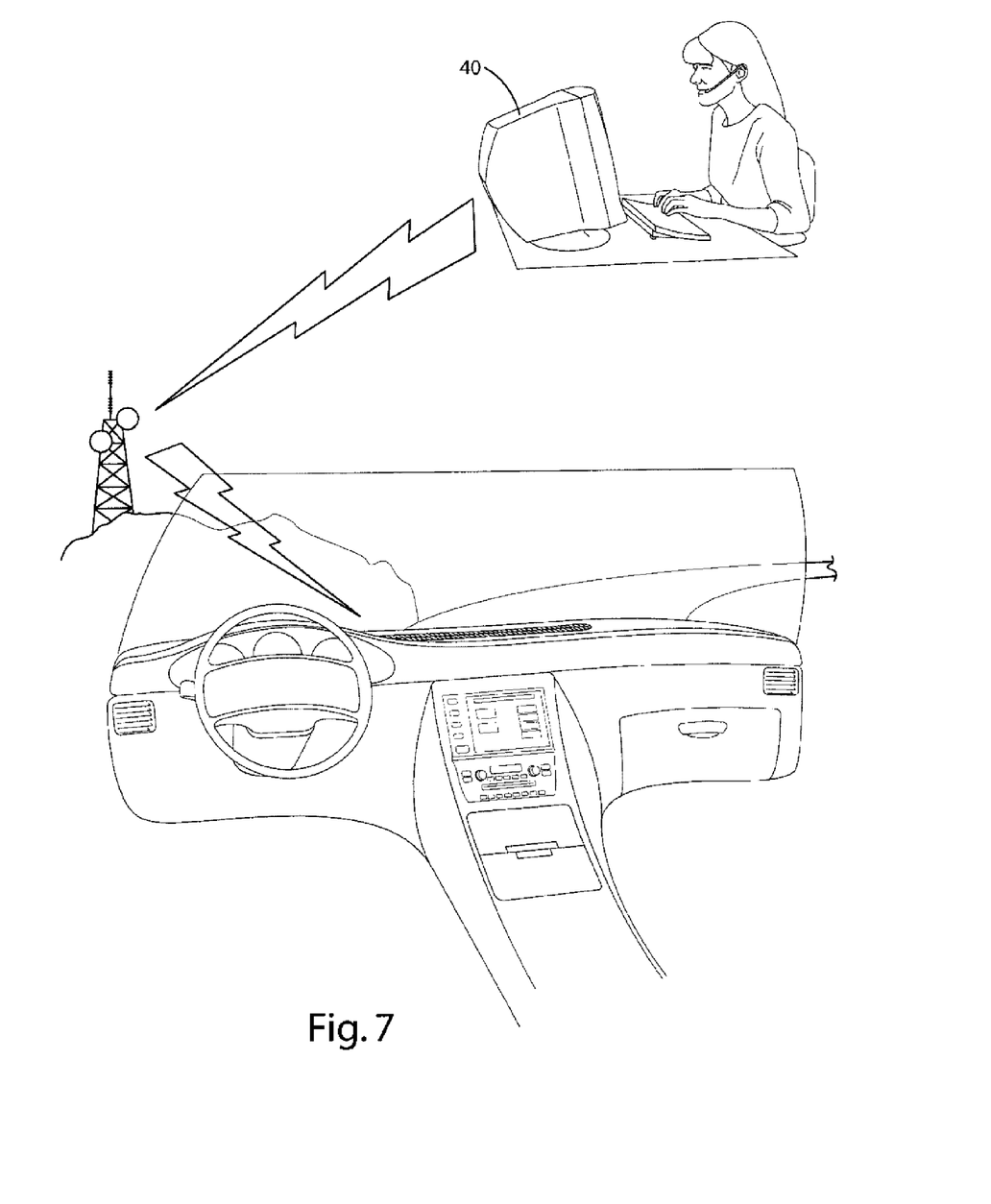
FIG. 7 is schematic diagram illustrating the customization of a vehicle entertainment system from a remote location, such as a home computer.

In an exemplary embodiment, system 10 is capable of being remotely customized from a remote secondary device 40. The remote secondary device 40 can be a computer, cell phone or any other device known in the art. A controller is disposed within the system 10. The controller is capable of receiving user input through an internet connection. The internet connection can be wired, wireless, network, ethernet, or any other connection known in the art. Additionally, the system could utilize Bluetooth connectivity or a Wi-Fi connection to transfer the user input from the secondary device 40 to the system 10. The system 10 is customized by receiving the user input from the secondary device 40 through the internet connection. The system 10 includes a display 20 that is in communication with the controller and is capable of implementing the received user input. The display 20 includes a display interface 22 capable of displaying content customizable based on the received user input. The display interface 22 is the portion of the display 20 having the soft touch preset 34 that allow for human machine interface. The system also allows for a wider variety of changes, including graphical changes to the display interface 22, commonly known in the industry as "skins". This allows easy graphical customization without the need for expensive or complex graphic editing capabilities directly in the vehicle entertainment system. The system 10 allows a user to remotely customize content displayed on the display interface 22, including but not limited to the theme, font, color, shape, size, layout, applications, graphics, presets or any other function known in the art. The user can select a predetermined content or create their own content to be displayed on the display 20.

Pages and menus on the display 20 can be easily customized by simply using the secondary device 40 or internet application's graphical user interface. The addition of additional pages and menus might also be possible. The customization may include but is not limited to the ability to edit the following list of options: themes, presets, layouts and applications (gas prices, date and time, weather, traffic, internet radio, photos, music and videos). It also includes the ability to modify settings on various screens, including but not limited to: climate, audio maps, web, and diagnostics. Presets 30 may be edited to change their content, graphics, color, shape, size, and other related information. The layout is flexible and can be changed according to the user's preference. The list of presets 30 can he placed horizontally, vertically, or in any other pattern that the user prefers.

The layout of presets in FIG. 2 illustrates an exemplary layout. Any desired layout may be used and the user may arrange the presets as desired, or use the provided manufacturer's arrangement. The system 10 is only constrained by the particular limitations of the vehicle entertainment system. As illustrated in FIG. 4, other layout configurations may be used and the buttons at the bottom of the screen may be used to select both media sources as well as favorite selections on particular media sources. The system 10 may include both hard presets 32 and soft presets 34 as illustrated in FIG. 4. The display 20 can also show a skin or desired graphical interface above the media buttons or other displayed content such as album art, an equalizer, or any other desired display content.

Figure 1:
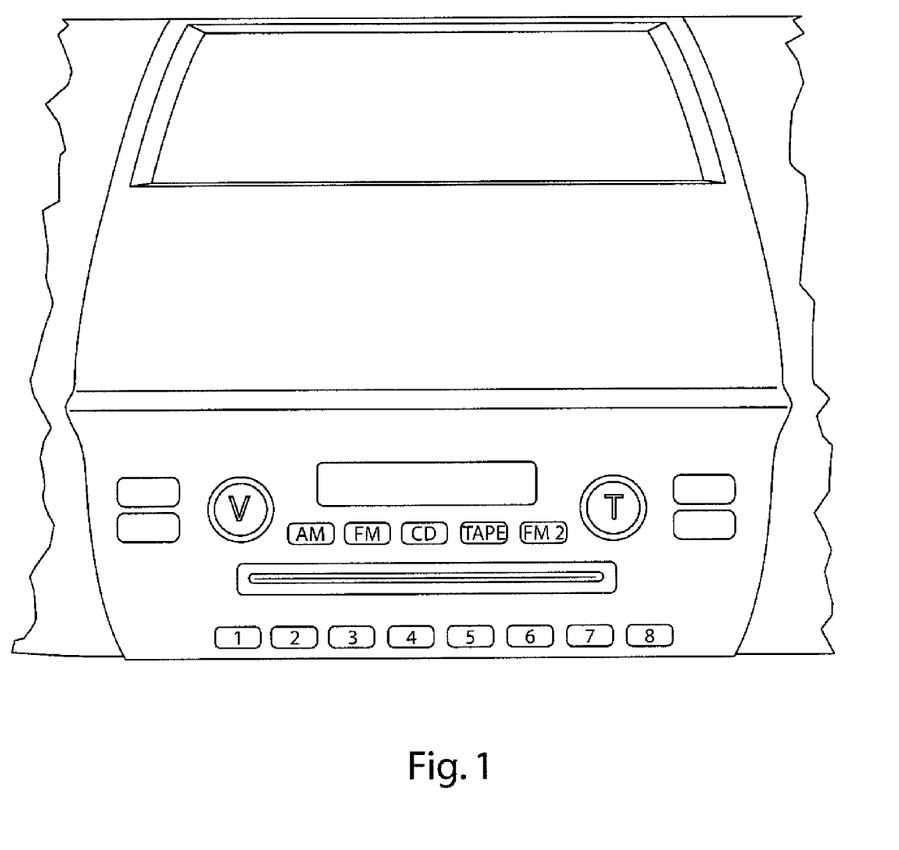
FIG. 1 is an illustration of a prior art radio display for a vehicle entertainment system, which is constrained to hard key preset allowing only single source favorites.

In some embodiments, the vehicle entertainment system 10 may be set up to have multiple menu screens such as an overall menu screen of FIG. 1 as well as more detailed menu screens of limited selection for different users or different user preferences. This allows the user to have different favorite screens and may also allow the users to set different grids for favorite presets 30 such as when a vehicle has two different drivers, the first user may have a desired display grid while the second user may have a different desired display grid.

As most listeners of music use very few presets in each media source, it may be possible for the total number of favorite presets across all media sources to be easily fit within one screen thereby simplifying the controls for the vehicle entertainment system.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A vehicle entertainment system capable of being remotely customized from a remote secondary device, said system comprising:
   a controller disposed within said system capable of receiving user input through an internet connection and wherein said system is customized by receiving the user input from the secondary device through the internet connection; and
   a display in communication with said controller and capable of implementing said received user input and wherein said display includes a display interface capable of displaying customizable content based on said received user input and wherein said display interface and said customizable content is capable of customization to the at least one of theme, font, color, shape, size layout, and graphics.

2. The system as set forth in claim 1 wherein said display includes at least one single-action preset button being customizable that in response to only a single-action instructs said controller to select a specific input source from a plurality of input sources having at least one selection and to select a specific selection of said at least one selection of each said input source.

3. The system as set forth in claim 2 wherein said input sources include at least one of an AM radio feed, FM radio feed, satellite radio feed, TV feed, web browser, mobile phone interface, navigation interface, mass storage device, computer interface, music player, CD changer, internet radio, remote servers, microblog, and video interface.

4. The system as set forth in claim 2 wherein said single-action button is a hard key button disposed on display adjacent the display interface.

5. The system as set forth in claim 2 wherein said single-action button is a soft-touch button displayed on said display interface.

6. The system of claim 5 wherein said soft-touch button is in a first location on said display interface and wherein said soft-touch button is capable of being dragged and dropped to a new location.

7. The system as set forth in claim 1 further including a secondary device remote of said controller and capable of receiving the user input from a user to be transferred to the controller.

8. A vehicle entertainment system capable of being remotely customized, said system comprising:
   a controller capable of receiving user input;
   an internet connection capable of transmitting the user input to said controller to allow for the remote customization of said system; and
   a display in communication with said controller and capable of implementing said received user input, and wherein said display includes a display interface capable of customization based on the received user input, and wherein said display interface is capable of remote customization to the at least one of theme, font, color, shape, size, layout, application, and graphics.

9. The system as set forth in claim 8 further including a secondary device remote of said controller and capable of obtaining the user input from a user to be transmitted to said controller.

10. The system as set forth in claim 8 wherein said internet connection is one of a wired, wireless, network or ethernet connection.

11. The system as set forth in claim 8 wherein said display interface includes at least one single-action preset button being customizable that in response to only a single-action instructs said controller to select a specific input source from a plurality of input sources having at least one selection and to select a specific selection of said at least one selection of each said input source.

12. The system as set forth in claim 11 including at least one output interface providing an output of the specific input source and the specific selection in response to said single-action.

13. The system as set forth in claim 11 wherein said single-action button is a soft-touch button displayed on said display interface.

14. The system as set forth in claim 11 wherein said input sources include at least one of an AM radio feed, FM radio feed, satellite radio feed, TV feed, web browser, mobile phone interface, navigation interface, mass storage device, computer interface, music player, CD changer, internet radio, remote servers, microblog interface, and video interface.

15. The system as set forth in claim 14 wherein said input source is said mobile phone interface and said specific selection is an instruction to the mobile phone to dial a particular phone number.

16. The system as set forth in claim 14 wherein said input source is said music player and said specific selection is an instruction to provide audio output from one of an album, an artist or a playlist on said music player.

17. The system as set forth in claim 14 wherein said input source is said CD changer and said specific selection is a specific CD location within said CD changer.

18. The system as set forth in claim 14 wherein said input source is said navigation interface and said specific selection is an instruction to the navigation system to provide directions to a specific destination.

19. The system as set forth in claim 14 wherein said input source is at least one of said web browser, mass storage device, computer interface, and video interface, and wherein said specific selection is an instruction to customize at least one of theme, font, color, shape, size, layout, application, graphics, and presets.

20. The system as set forth in claim 14 wherein said input source is said microblog interface and said specific selection is an instruction to provide a blog entry to a microblog.

21. The system as set forth in claim 20 wherein said blog entry is limited to 200 characters.

22. A method of remotely customizing a vehicle entertainment system having a controller capable of receiving user input and a display including a display interface capable of implementing the user input, said method comprising the steps of:
 receiving user input through an internet connection by the controller within the vehicle entertainment system;
 implementing the user input on the display in communication with the controller; and
 selecting at least one selection within a selected input source within the vehicle entertainment system by:
  engaging a single-action preset button that in response to only a single-action performs the steps of:
   changing the active input source to a selected preprogrammed input source associated with the single-action preset button; and
   performing a specific action relating to the selected input source.

23. The method as set forth in claim 22 further including the step of entering the user input into a secondary device to be transmitted to the controller to remotely customize the vehicle entertainment system.

24. The method as set forth in claim 22 further including the step of entering new user input into the secondary device to be transmitted to the controller to replace the previous user data.

25. The method as set forth in claim 22 wherein said user input is capable of customization to the at least one of theme, font, color, shape, size, layout, application, and graphics.

26. The method as set forth in claim 22 wherein said input source include at least one of an AM radio feed, FM radio feed, satellite radio feed, TV feed, web browser, mobile phone interface, navigation interface, mass storage device, computer interface, music player, CD changer, interne radio, remote servers, microblog, and video interface.

* * * * *

UNITED STATES PATENT AND TRADEMARK OFFICE
CERTIFICATE OF CORRECTION

PATENT NO. : 8,095,065 B2 Page 1 of 1
APPLICATION NO. : 12/342259
DATED : January 10, 2012
INVENTOR(S) : Wes Albert Nagara et al.

It is certified that error appears in the above-identified patent and that said Letters Patent is hereby corrected as shown below:

In The Claims:

Column 10, Line 36, should read as follows: -- computer interface, music player, CD changer, internet radio, --

Signed and Sealed this
Twenty-eighth Day of February, 2012

David J. Kappos
*Director of the United States Patent and Trademark Office*